Oct. 14, 1969     L. MAESTRELLO     3,472,472
CONTROL OF SOUND-EMITTING VIBRATION RESULTING FROM
TURBULENT AIR FLOW ACROSS AN AIRCRAFT SKIN PANEL
Filed June 28, 1967
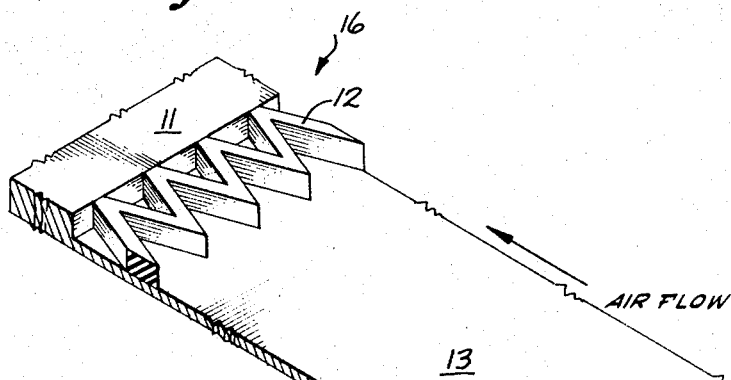
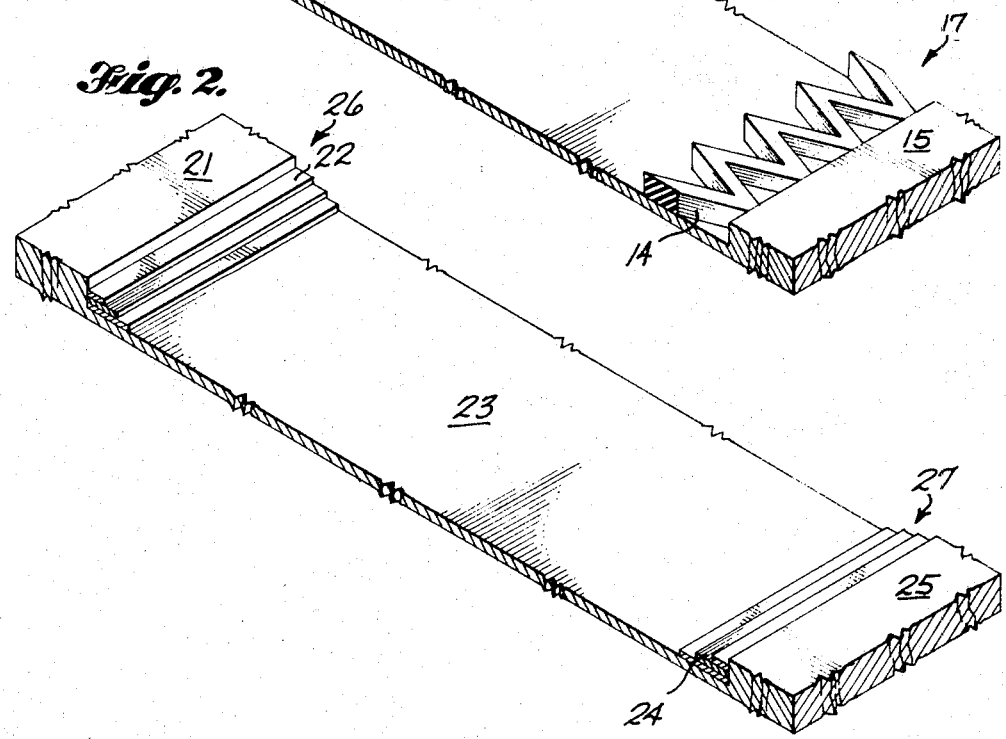
INVENTOR.
LUCIO MAESTRELLO
BY *Leo K. Murchison*
AGENT

United States Patent Office 3,472,472
Patented Oct. 14, 1969

3,472,472
CONTROL OF SOUND-EMITTING VIBRATION RESULTING FROM TURBULENT AIR FLOW ACROSS AN AIRCRAFT SKIN PANEL
Lucio Maestrello, Bellevue, Wash., assignor to The Boeing Company, Seattle, Wash., a corporation of Delaware
Filed June 28, 1967, Ser. No. 650,571
Int. Cl. B64c 1/40, 1/12
U.S. Cl. 244—117                          8 Claims

ABSTRACT OF THE DISCLOSURE

A method and two mechanisms for substantially minimizing turbulent-fluid-flow caused vibration buildup or reverberation longitudinally in a panel, the mechanisms comprising rubber wedges and varied effective panel thickness on two opposite edges of two spaced apart rigid members traversing a panel at right angles and providing a gradual change in stiffness at the interfaces of the panel and the rigid members with the vibration-producing turbulent fluid flow across the panel, especially as found in airflow, for example, across aircraft fuselage panels, where turbulent airflow across the exterior of a fuselage panel causes panel vibration to emit noise to the interior of the aircraft.

OBJECTS

An important object of this invention is to provide a panel structure suitable for use in an aircraft fuselage in the minimization of panel vibration (and consequently noise emitted thereby to an aircraft interior) caused by turbulent airflow around the aircraft.

A further important object is to provide novel panel structure which gives some eleven db of sound suppression with nominal additional mass as compared with the three db sound attenuation to be expected with a doubling of the panel mass as might be conventionally accomplished.

Another object is to provide a structure according to this invention which embodies a method for producing the inventive steps required to accomplish this invention.

BRIEF SUMMARY OF THE INVENTION

A method of minimizing turbulent-fluid-flow caused vibration buildup or reverberation longitudinally in a panel and two mechanisms for carrying out the method are disclosed, as rubber wedges and varied effective panel thickness which produce a variation and gradual increase in panel stiffness at the interface of the panel and rigid members traversing the panel at right angles to vibration-producing turbulent fluid flow across the panel in order to minimize the buildup of panel vibrations started by the turbulent fluid flow as a result of reverberations from the interface of the panel and the rigid members.

BRIEF DESCRIPTION OF FIGURES

FIGURE 1 is an isometric segmented view of a portion of a panel having wedge-shaped members (preferred embodiment) adjacent rigid panel-traversing members in order to minimize the reflection of panel vibrations from the interface of the panel and the traversing members.

FIGURE 2 is an isometric segmented view of another embodiment of this invention wherein multiple layers are used instead of wedge-shaped members.

THEORY OF OPERATION

There are basically four components that excite the skin panel structure of an airplane: unsteady boundary layer, jet or propeller noise, compressor whine, and thrust-reversal noise. The most persistent source is the unsteady boundary layer pressure field because the aircraft is enveloped by it. A component of the boundary layer pressure fluctuation in each panel mode generates small force oscillations, but the skin panel does not respond similarly for all frequencies and wave numbers of the turbulence. When the boundary layer pressure field matches both the wave number and the frequency of a particular panel mode, a condition called "coincidence" occurs which results in a very strong excitation of particular modes that cause a peak response. The amplitude of panel displacement depends upon the amplitude of the characteristic length of the boundary layer pressure field, and the resulting matching or mismatching of the wave number and frequency of both turbulence and the panel which causes the driving pressure field to excite the panel structure. Therefore, by modifying the abutting panel supporting edges or other rigid members traversing the longitudinal or airflow axis of the fuselage, a reduction in the acoustic power radiated to the aircraft interior by the panel structure is provided because this minimizes reverberation built up due to panel discontinuities by traversing rigid members.

This panel construction is designed to reduce the noise radiation level and its equivalent vibration amplitude when oriented against the wave in a structure. A large part of the energy is absorbed by this panel construction before the wave reaches the sharp boundary discontinuity of the structure (part of the joint) minimizing the reflection which is the cause of the sound. Therefore the length of the panel construction must be several orders of magnitude longer than its thickness to allow for gradual absorption of the energy of the incoming wave. Application on the airplane fuselage on a typical side wall panel shows a large reduction in interior noise and panel vibration level far superior to any existing damping material of a comparable weight.

A more detailed explanation and theoretical analysis as believed experimentally established is found in two printed publications by this inventor:

(1) "Use of Turbulent Model To Calculate the Vibration and Radiation Responses of a Panel With Practical Suggestions for Reducing Sound Level" found on pages 38–78 of the May 1967 issue of the Journal of Sound and Vibration, vol. 5, Nov. 3, 1967.

(2) "Design Criterion for Maximum Structural Response and Sound Radiation of a Panel Excited by a Turbulent Boundary Layer" found in AIAA Paper No. 67–12 for the 5th Aerospace Sciences Meeting and dated Jan. 23–26, 1967 (submitted around Jan. 1, 1967).

DESCRIPTION

In both FIGURE 1 and FIGURE 2 the vibration-producing turbulent fluid flow would normally occur along the flat back surface (not shown) of the panels 13 or 23. As indicated by the figures, only an illustrative elongated portion of a panel 13 or 23 is shown. The longitudinal panel 13 or 23 may be much larger than illustrated and the rigid, transverse members 11, 15, 21 or 25 may be actual supporting members for the panels 13 or 23 or merely tear stoppers inserted between supporting members.

More particularly, in FIGURE 1, a first rigid, transverse member 11, which may be integral with the panel 13 or suitably attached to the panel, for example, by bonding, has upward facing interfaces 16, 17 facing the interior of the aircraft fuselage, for example, comprised of rubber wedges 12, 14 glued each to its respective rigid member 11 or 15 and extending longitudinally from the side of its rigid member 11 or 15 onto and glued to the panel 13. A suitable panel 13 and rigid member 11 or 15 material is aluminum. A suitable rubber material for wedges 12, 14 is silicone rubber and a suitable glue is Dow Corning Q3-0121 aerospace sealant. Because each interface 12 has points or converging walls extending away from the rigid members 11 toward the center of the panel, the stiffness of the interface and panel adhered thereto decreases toward these points. The portion of the interface secured to the rigid member is stiffened by it and accordingly this portion is the most rigid, with the stiffness of the interface and the panel adhered thereto, and the cross-sectional area of the interface decreasing toward the points and smallest cross-section of the interface where the least stiffening results.

In FIGURE 2 another embodiment is disclosed wherein multiple transverse layers 22 or 24 of panel 23, material are suitably bonded or glued (for example Wodwood contact cement) together to form an interface 26, 27 between rigid, transverse members 21, 25 and the longitudinal panel 23 in order to provide a selected or gradual variation in stiffness from the panel 23 through the respective interface 26 or 27 into the corresponding rigid member 21 or 25. In operation with the panels 13 and 23 forming the skin of an aircraft, for example, the slipstream rushes over the lower side of the panels, as illustrated in FIGURES 1 and 2, causing an unsteady boundary layer or highly turbulent fluid flow thereover at speeds from high subsonic to supersonic.

The turbulent pressure field excites wave ripples over the panel. These wave ripples, having upstream and downstream velocity components, are reduced in amplitude and frequency and the reverberation occuring at the panel edges is substantially reduced due to the varying thickness and stiffness of the rubber wedges and the successive layers 22 and 24, both for providing a gradual increase in stiffness of the panel at the rigid members. Thus a mismatch in phase and amplitude of the waves due to the rubber wedges absorbs the energy of the waves, contributing to a reduction in volume and velocity of the wave action resulting in considerable reduction in acoustical power radiated from the skin panel internally of the aircraft.

Thus with the wedges or successive layers on the edges of the rigid members transversely of the fuselage longitudinal axis or airflow for providing a gradual change in stiffness between the skin panel and the rigid members, the acoustical power radiated to the interior of the aircraft from the skin panel is reduced, particularly due to the longitudinal reverberation between the transverse rigid members being attenuated by the wedges or successive layers.

What is claimed is:

1. An aircraft operable at speeds between high subsonic and supersonic having a skin panel construction which minimizes panel vibration due to longitudinal turbulent high subsonic to supersonic air flow over the outside surface thereof comprising,
    (1) a sheet of aircraft skin material forming the outer surface of said panel exposed to high subsonic to supersonic longitudinal turbulent air flow and having fore and aft ends,
    (2) two spaced apart rigid members having a predetermined thickness and traversing said panel at said ends normal to the air flow, and
    (3) means having a predetermined length for providing a gradual increase in the stiffness of said aircraft skin panel where the panel interfaces with each of said rigid members traversing the panel, said length of said means being substantially greater than said thickness of said rigid members, and said means being on the edge of each rigid member facing the other member in order to prevent an abrupt interface between each of said rigid members and said panel and accordingly substantially reducing the reflections of vibrations and reverberations traveling through said aircraft skin panel between said rigid members.

2. An aircraft skin panel construction as defined in claim 1 wherein said means for providing a gradual increase in the stiffness is a wedge-shaped flexible material having its interface wholly secured to said panel.

3. An aircraft skin panel construction as defined in claim 1 wherein said means for providing a gradual increase in stiffness is comprised of multiple layers of flexible material on both adjacent edges of said rigid members.

4. A method of minimizing turbulent-fluid-flow-caused vibration buildup and reverberation longitudinally in an aircraft skin panel due to flying at high subsonic and faster speeds comprising the steps of,
    (1) gradually changing the stiffness of a transverse edge of a rigid member of said panel for varying the stiffness of said panel longitudinally,
    (2) forming flexible material on the transverse edge of said rigid member of a length substantially greater than the thickness of the rigid member, and
    (3) directing said vibration and reverberation due to flight speeds at high subsonic and faster at said gradually stiffened edge for attenuation of the vibration and reverberation throughout the aircraft skin panel.

5. A method as recited in claim 4 wherein the first step comprises,
    (1) forming wedges on said aircraft skin panel protruding longitudinally from said transverse edge for varying the stiffness of said aircraft skin panel longitudinally.

6. A method as recited in claim 4 wherein the first step comprises,
    (1) gradually changing the stiffness of a transverse edge of a rigid member on said aircraft skin panel by tapering the transverse edge of the rigid member longitudinally of said panel for varying the stiffness of said aircraft skin panel longitudinal.

7. A method as recited in claim 4 wherein the first step comprises,
    (1) gradually changing the stiffness of a transverse edge of a rigid member on said aircraft skin panel by forming the transverse edge of the rigid member into multiple transverse layers reducing in number longitudinally from the thickness of the rigid member to the thickness of the aircraft skin panel for varying the stiffness longitudinally of the aircraft skin panel.

8. A method of minimizing turbulent-fluid-flow-caused vibration buildup and reverberation in an aircraft skin panel due to flying through the air at high subsonic and faster speeds comprising the steps of,
    (1) gradually changing the stiffness of a transverse edge of two rigid transverse members on said aircraft skin panel for varying the stiffness of said aircraft skin panel longitudinal,
    (2) forming flexible material on the transverse edge of said rigid member of a length substantially greater than the thickness of the rigid member, and (3) directing said vibration and reverberation from one gradually stiffened transverse edge to the other gradually stiffened transverse edge for attenuation of both said vibration and reverberation due to the aircraft high subsonic and faster speeds.

References Cited

UNITED STATES PATENTS

| | | | |
|---|---|---|---|
| 1,951,217 | 3/1934 | Slocum | 52—402 |
| 2,032,698 | 3/1936 | Grady | 49—303 |
| 2,935,769 | 5/1960 | Lutes | 160—90 X |
| 3,217,921 | 11/1965 | Frehse | 49—479 X |
| 2,086,571 | 7/1937 | Novambere | 52—615 X |
| 2,254,152 | 8/1941 | Klemm | 244—119 |
| 2,581,625 | 1/1952 | Brady | 244—129 |
| 2,959,257 | 11/1960 | Campbell | 52—615 |
| 3,071,217 | 1/1963 | Gould | 244—119 |
| 3,106,373 | 10/1963 | Bain | 244—119 X |
| 3,160,549 | 12/1964 | Caldwell et al. | 244—119 X |

MILTON BUCHLER, Primary Examiner

THOMAS W. BUCKMAN, Assistant Examiner

U.S. Cl. X.R.

52—144, 403